United States Patent
Hatano et al.

(10) Patent No.: US 11,915,868 B2
(45) Date of Patent: Feb. 27, 2024

(54) ACTUATOR AND MANUFACTURING METHOD OF ACTUATOR TO REDUCE COIL WIRE DISCONNECTION

(71) Applicant: NIDEC SANKYO CORPORATION, Nagano (JP)

(72) Inventors: Shinji Hatano, Nagano (JP); Yuichi Takei, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 93 days.

(21) Appl. No.: 17/707,972

(22) Filed: Mar. 30, 2022

(65) Prior Publication Data

US 2022/0319753 A1 Oct. 6, 2022

(30) Foreign Application Priority Data

Apr. 2, 2021 (JP) .................................. 2021-063218

(51) Int. Cl.
*H01F 7/08* (2006.01)
*H01F 7/126* (2006.01)
*H01F 41/02* (2006.01)
*H01F 7/127* (2006.01)

(52) U.S. Cl.
CPC ............. *H01F 7/081* (2013.01); *H01F 7/126* (2013.01); *H01F 7/127* (2013.01); *H01F 41/02* (2013.01); *H01F 2007/086* (2013.01)

(58) Field of Classification Search
CPC .......... H01F 7/081; H01F 7/126; H01F 7/127; H01F 41/02; H01F 2007/086; H01F 5/04; H01F 7/122; H02K 33/18; H02K 33/16; H02K 15/00
See application file for complete search history.

(56) References Cited

U.S. PATENT DOCUMENTS

| 4,392,701 A * | 7/1983 | Weidler ............... H01R 25/006 439/76.1 |
| 2011/0312213 A1* | 12/2011 | Arai ....................... H01R 12/62 439/492 |
| 2019/0190365 A1* | 6/2019 | Takeda ................... H02K 33/16 |
| 2020/0204054 A1 | 6/2020 | Mori |

FOREIGN PATENT DOCUMENTS

JP 2020102902 7/2020

* cited by examiner

*Primary Examiner* — Bernard Rojas
(74) *Attorney, Agent, or Firm* — JCIPRNET

(57) ABSTRACT

An actuator comprises a support body including a coil having a winding part and a lead part, a coil holder and a board supported by the coil holder, a movable body having a magnet, and a magnetic drive mechanism structured to relatively move the support body and the movable body. The coil holder has a coil holding part holding the winding part and a board support part supporting the board. A board surface of the board is provided with a land with which the lead part is connected. The board support part has a recessed part at a position overlapping with the board when viewed in a direction along the board surface, and the lead part is extended from the winding part to the land via the recessed part and is provided with a resiliently bent portion which is resiliently bent in an inside of the recessed part.

11 Claims, 10 Drawing Sheets

ACTUATOR AND MANUFACTURING METHOD OF ACTUATOR TO REDUCE COIL WIRE DISCONNECTION

CROSS REFERENCE TO RELATED APPLICATION

The present invention claims priority under 35 U.S.C. § 119 to Japanese Application No. 2021-063218 filed Apr. 2, 2021, the entire content of which is incorporated herein by reference.

TECHNICAL FIELD

At least an embodiment of the present invention may relate to an actuator structured to move a movable body by a magnetic drive mechanism including a coil and a magnet. Further, at least an embodiment of the present invention may relate to a manufacturing method of the actuator.

BACKGROUND

As a device for notifying information by vibration, an actuator has been proposed which is structured to vibrate a movable body supported in a support body by a magnetic drive mechanism. An actuator disclosed in Japanese Patent Laid-Open No. 2020-102902 (Patent Literature 1) includes a movable body, a support body, a connection body which relatively movably connects the movable body with the support body, and a magnetic drive mechanism structured to relatively move the movable body and the support body. The movable body includes a magnet. The support body includes a coil, a coil holder which holds the coil, and a power feeding circuit board fixed to the coil holder. The magnet and the coil face each other in a thickness direction of a winding part of the coil to structure the magnetic drive mechanism. A lead part of a coil wire extended from the winding part of the coil is connected with a power feeding circuit board which is disposed on an outer side in a radial direction with respect to the winding part.

The lead part extended from the winding part is extended in a straight line shape between the winding part and the power feeding circuit board. Therefore, when a strong impact is applied to the actuator from the outside due to falling or the like, tensile force is applied to the lead part and disconnection may occur. Further, when thermal change occurs in the actuator, tensile force is applied to the coil wire due to shrinkage of the coil wire and thus, disconnection may also occur.

SUMMARY

At least an embodiment of the present invention may advantageously provide an actuator which is capable of preventing or restraining a coil wire from disconnecting even when tensile force is applied to the coil wire. Further, at least an embodiment of the present invention may advantageously provide a manufacturing method of the actuator.

According to at least an embodiment of the present invention, there may be provided an actuator including a support body including a coil having a winding part and a lead part extended from the winding part, a coil holder which holds the coil, and a board which is supported by the coil holder, a movable body having a magnet facing the winding part, a connection body which relatively movably connects the movable body with the support body, and a magnetic drive mechanism which includes the coil and the magnet and is structured to relatively move the support body and the movable body. The coil holder is provided with a coil holding part which holds the winding part and a board support part which supports the board on an outer side in a radial direction of the coil holding part, a board surface of the board is provided with a land with which the lead part is connected, the board support part is provided with a recessed part at a position overlapping with the board when viewed in a direction along the board surface, and the lead part is extended from the winding part to the land via the recessed part and is provided with a resiliently bent portion which is resiliently bent in an inside of the recessed part.

According to at least an embodiment of the present invention, the winding part of the coil is held by the coil holding part provided in the coil holder, and the board is supported by the board support part provided in the coil holder. The lead part of the coil which is extended from the winding part of the coil and is connected with the land of the board is provided with a resiliently bent portion between the winding part and the land. Therefore, in a case that tensile force is applied to the lead part due to an impact or a thermal change, the resiliently bent portion is extended and elongated and thus, the lead part is prevented from becoming a state being pulled between the board and the winding part. As a result, the lead part is prevented or restrained from disconnecting. In addition, the lead part is extended from the winding part to the land via the recessed part and the resiliently bent portion is provided in an inside of the recessed part. Therefore, the resiliently bent portion can be prevented or restrained from moving on the coil holder to interfere with other members. Further, the recessed part is provided in the board support part at a position overlapping with the board when viewed in a direction along the board surface of the board. As a result, the resiliently bent portion is provided in the vicinity of a tip end portion of the lead part which is connected with the land. Therefore, when tensile force is applied to the lead part, an excessive load is easily restrained from applying to the tip end portion of the lead part which is fixed to the land by solder.

In at least an embodiment of the present invention, it may be structured that the actuator includes an adhesive layer which fixes the coil to the coil holder, and the adhesive layer is provided between the winding part and the coil holding part without being provided between the resiliently bent portion and an inner wall face of the recessed part. According to this structure, when tensile force is applied to the lead part due to an impact or a thermal change, the resiliently bent portion can be freely moved. Therefore, the lead part is easily prevented from disconnecting.

In at least an embodiment of the present invention, it may be structured that the coil holding part is a hole which accommodates the winding part, the coil holder is provided with a guide groove which guides the lead part, and the guide groove communicates with the recessed part and the coil holding part. When the guide groove is provided, the lead part extended from the winding part can be routed so as to go via the recessed part.

In at least an embodiment of the present invention, it may be structured that the guide groove is provided with a first groove portion, which is connected with the recessed part in a depth shallower than the recessed part, and a second groove portion which is extended from the first groove portion toward the coil holding part and is deepened as approaching the coil holding part. According to this structure, in comparison with a case that a deep guide groove connects between the coil holding part and the recessed part, a thickness of the portion of the coil holder where the guide groove is formed can be secured. As a result, rigidity of the coil holder is easily secured.

In at least an embodiment of the present invention, it may be structured that, in a case that a direction where the winding part and the magnet face each other is defined as a first direction, and two directions perpendicular to the first direction and perpendicular to each other are defined as a second direction and a third direction, the coil holding part and the board support part are arranged in the second direction, the board surface faces an opposite side to the coil holding part in the second direction, the board is provided with a wiring connection part having the land and a pair of leg parts which are protruded to one side in the first direction from both end portions in the third direction of the wiring connection part, the board support part is provided with a pair of slits into which both end edges in the third direction of the board are respectively inserted from the other side in the first direction, and an insertion part which is inserted from the one side in the first direction to a cut-out opening of the board sectioned by the pair of the leg parts and the wiring connection part, the insertion part is provided with a tip end face which is abutted with the wiring connection part, and the recessed part is provided on the tip end face. According to this structure, when viewed in a direction along the board surface, the recessed part is easily provided at a position overlapping with the board.

In at least an embodiment of the present invention, it may be structured that the coil holder is made of resin, a pair of the leg parts are provided with a pair of protruded parts which are contacted with the insertion part from both sides in the third direction and, in a state before the insertion part is inserted to the cut-out opening, a pair of the protruded parts face each other in the third direction, and a distance in the third direction between the two protruded parts is narrower than a width in the third direction of the insertion part. According to this structure, in a case that the insertion part is inserted into the cut-out opening sectioned by a pair of the leg parts and the wiring connection part of the board, the insertion part is press-fitted to the cut-out opening. In other words, the protruded part provided in each of a pair of the leg parts provides a press fitting margin when the insertion part is inserted into the cut-out opening. As a result, the board is easily supported by the board support part.

In this case, it may be structured that the insertion part is provided with a pair of inclined faces, which are inclined in a direction separated from the wiring connection part toward a direction separated from the tip end face on both sides in the third direction of the tip end face, and a pair of side faces which are extended to an opposite side with respect to the wiring connection part in the first direction from ends of the inclined faces on an opposite side to the tip end face. In a state before the insertion part is inserted to the cut-out opening, a distance of the two protruded parts facing each other in the third direction is wider than a width in the third direction of the tip end face and is narrower than a distance in the third direction between a pair of the side faces. According to this structure, after the tip end face of the insertion part is inserted to the cut-out opening of the board, the insertion part can be press-fitted between a pair of the leg parts.

Next, according to at least an embodiment of the present invention, there may be provided a manufacturing method of the above-mentioned actuator. The manufacturing method comprises holding the winding part in the coil holding part of the coil holder, extending the lead part to an opposite side to the coil holding part in the second direction with respect to the recessed part, disposing the board on the other side in the first direction with respect to a pair of the slits in a posture that the board surface faces the opposite side to the coil holding part in the second direction, inserting both end edges in the third direction of the board into a pair of the slits from the other side in the first direction, and inserting the insertion part into the cut-out opening of the board, supporting the board at a temporary support position where each of a pair of the protruded parts is contacted with each of the inclined faces of the insertion part and a space is formed between the wiring connection part and the tip end face, connecting a tip end portion of the lead part with the land of the board located at the temporary support position, and pushing the board located at the temporary support position to a support position where each of a pair of the protruded parts is contacted with each of the side faces of the insertion part and the tip end face is abutted with the wiring connection part.

According to the manufacturing method of the actuator in accordance with at least an embodiment of the present invention, the board is disposed in the board support part at the temporary support position and the lead part is connected with the board and, after that, the board is pushed to one side in the first direction to dispose at the support position. In this case, when the board is moved from the temporary support position to the support position, the tip end portion of the lead part connected with the board is formed with a resiliently bent portion on one side in the first direction. Further, the resiliently bent portion is accommodated in an inside of the recessed part which is located on the one side in the first direction with respect to the board. Therefore, the lead part is easily provided with a resiliently bent portion which is resiliently bent in the inside of the recessed part.

Effects of the Invention

According to the actuator in the present invention, the lead part of the coil which is extended from the winding part of the coil and is connected with the land of the board is provided with a resiliently bent portion between the winding part and the land. Therefore, in a case that tensile force is applied to the lead part due to an impact or a thermal change, the resiliently bent portion is extended and elongated and thus, the lead part is prevented from being pulled between the board and the winding part. Accordingly, the lead part is prevented or restrained from disconnecting. Further, the resiliently bent portion is resiliently bent in the inside of the recessed part provided in the coil holder. Therefore, the resiliently bent portion can be prevented or restrained from moving on the coil holder to interfere with other members. In addition, the recessed part is provided in the board support part at a position overlapping with the board when viewed in a direction along the board surface of the board. As a result, the lead part is capable of providing with the resiliently bent portion in the vicinity of the tip end portion which is connected with the land. Therefore, when tensile force is applied to the lead part, an excessive load is easily restrained from applying to the tip end portion of the lead part which is fixed to the land by solder.

Further, in the manufacturing method of the actuator in accordance with the present invention, when the board with which the lead part is connected is moved from the temporary support position to the support position, a resiliently bent portion is formed on one side in the first direction of the tip end portion of the lead part which is connected with the board. Further, the resiliently bent portion is accommodated in the inside of the recessed part which is located on the one side in the first direction with respect to the board. Therefore, the lead part is easily provided with a resiliently bent portion which is resiliently bent in the inside of the recessed part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an actuator to which the present invention is applied will be described below with reference to the accompanying drawings. Further, a manufacturing method of the actuator will be also described below.
(Entire Structure)

Figure 1:
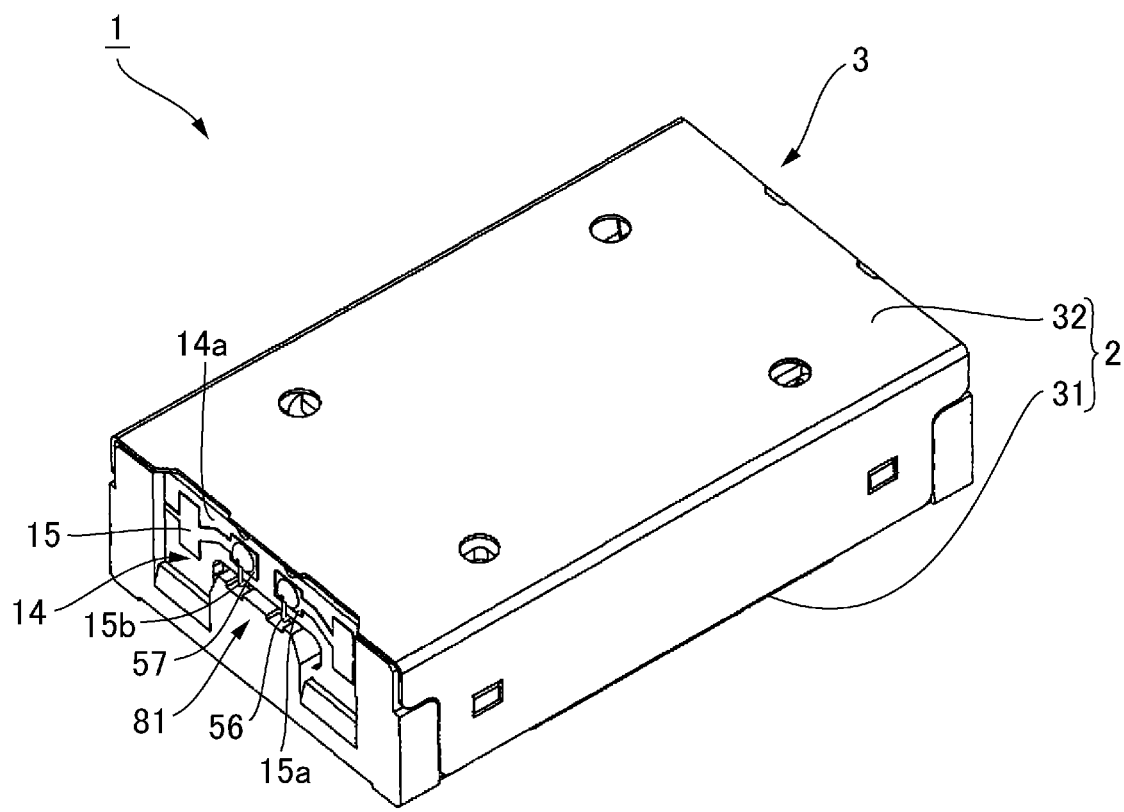
FIG. 1 is a perspective view showing an actuator to which the present invention is applied.
Figure 1:
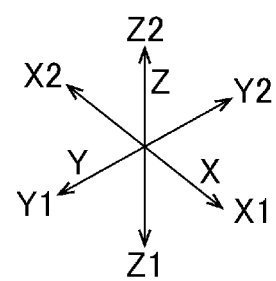
Figure 2:
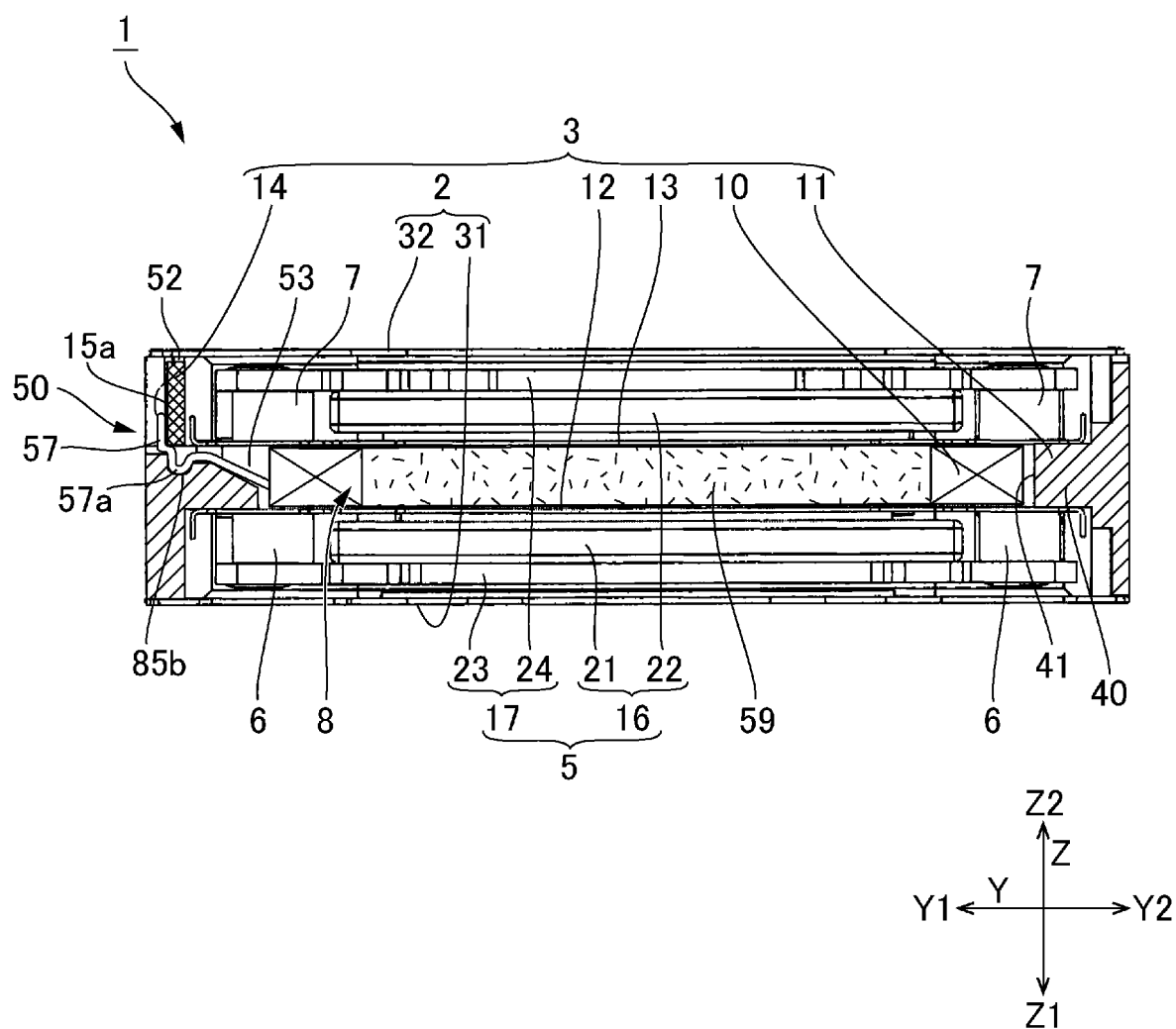
FIG. 2 is a cross-sectional view showing an actuator which is cut in a longitudinal direction.
Figure 3:
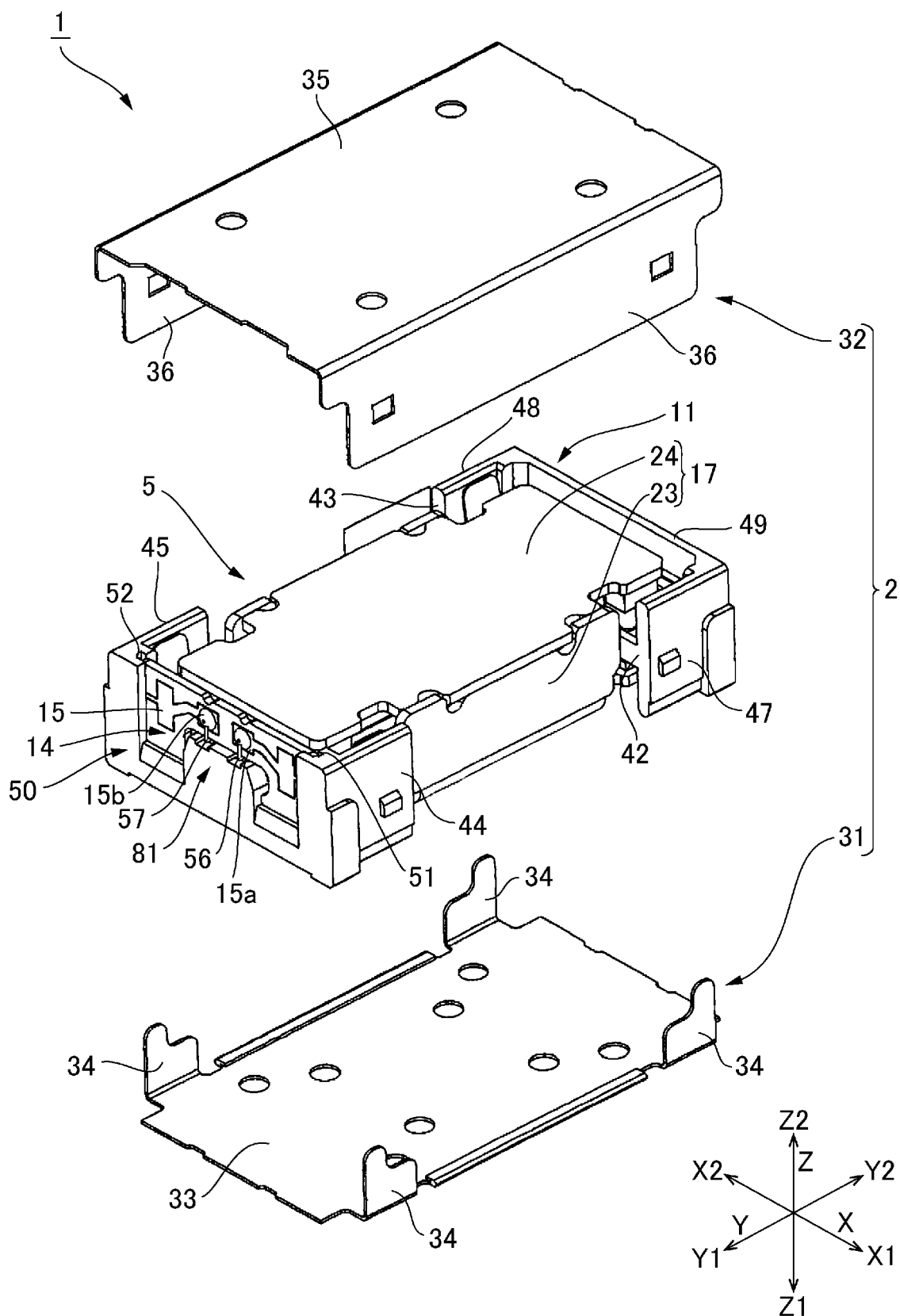
FIG. 3 is an exploded perspective view showing an actuator.
Figure 4:
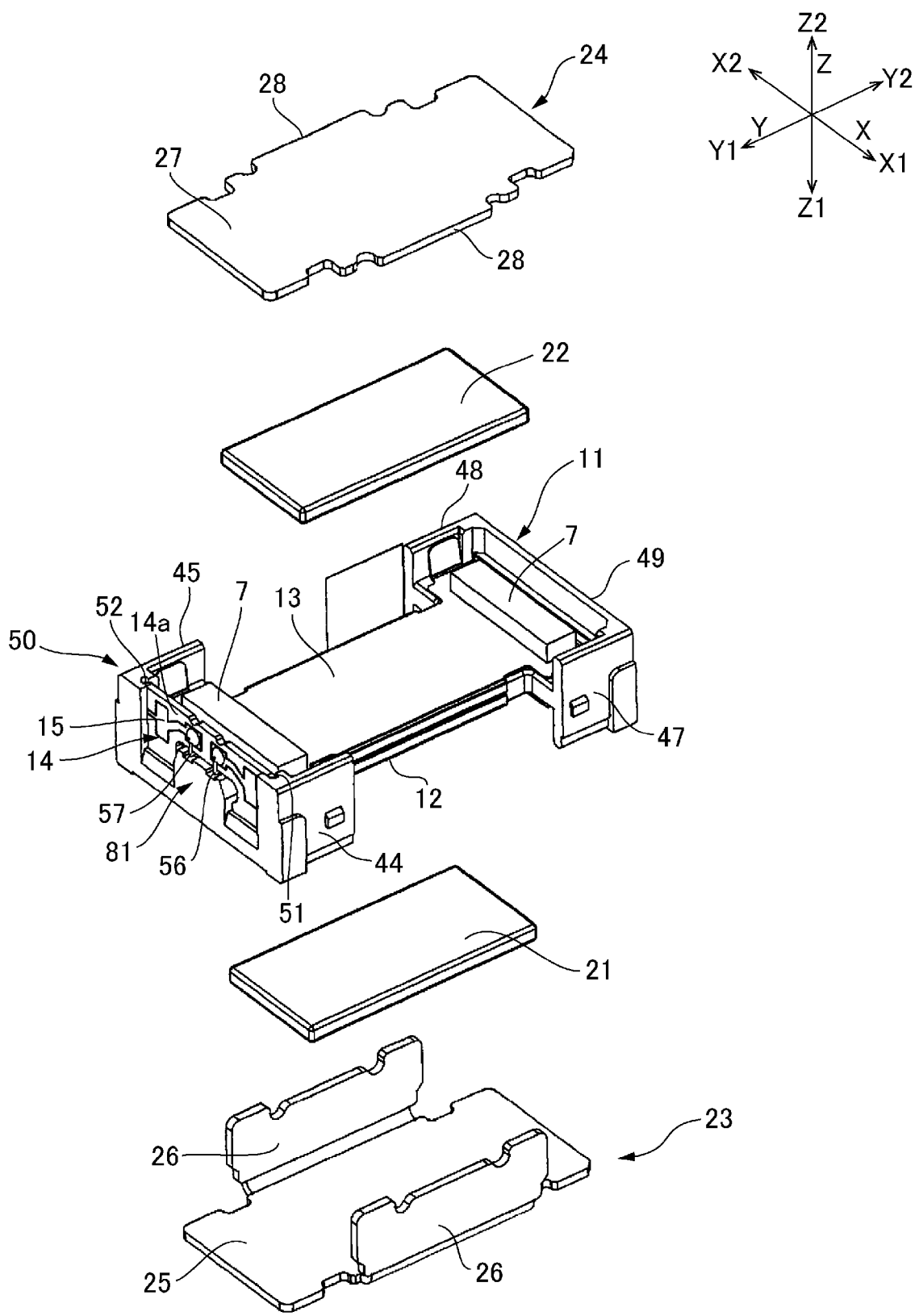
FIG. 4 is an exploded perspective view showing an actuator in which a case is detached.
Figure 5:
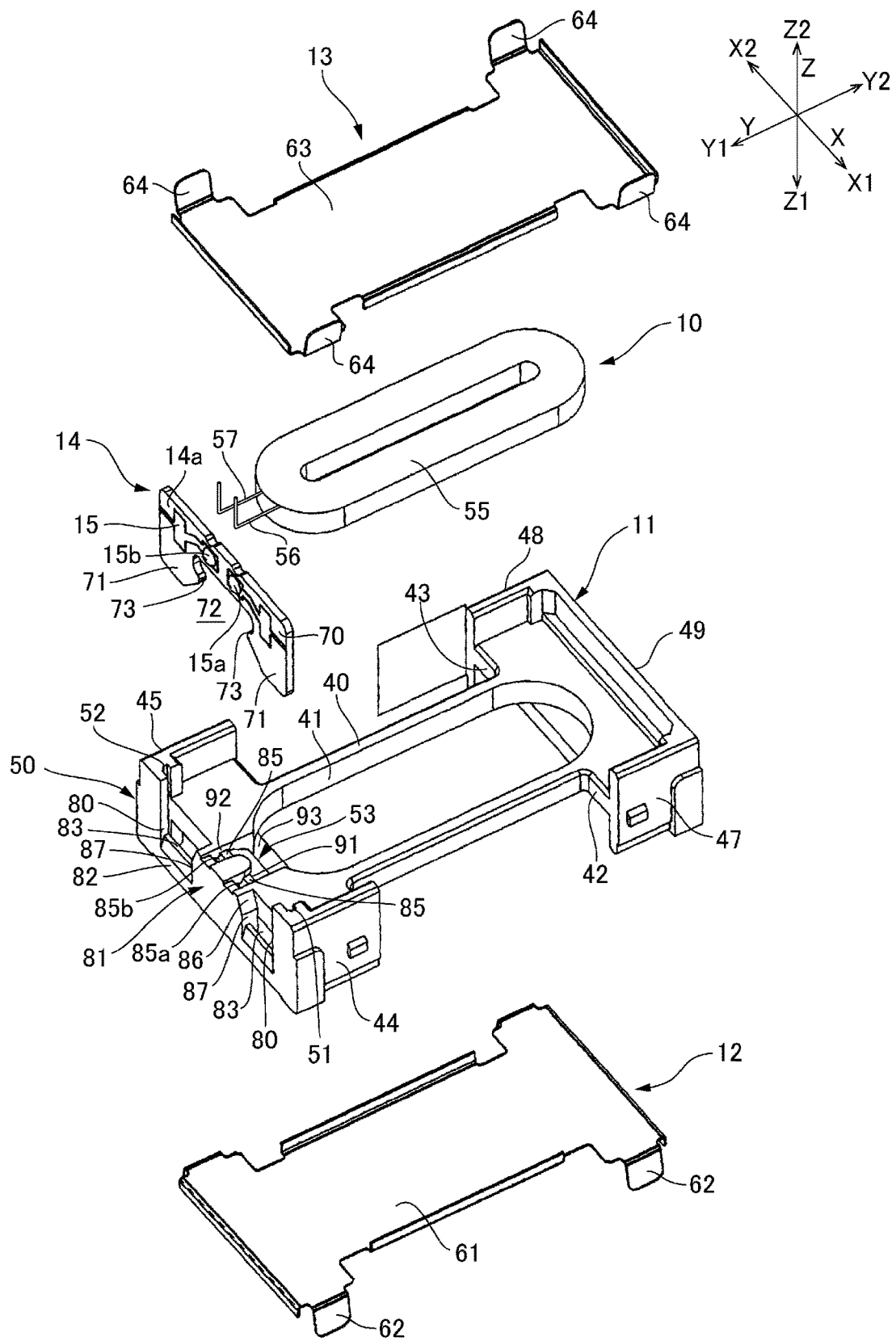
FIG. 5 is an exploded perspective view showing a support body in which a case is detached.
Figure 6:
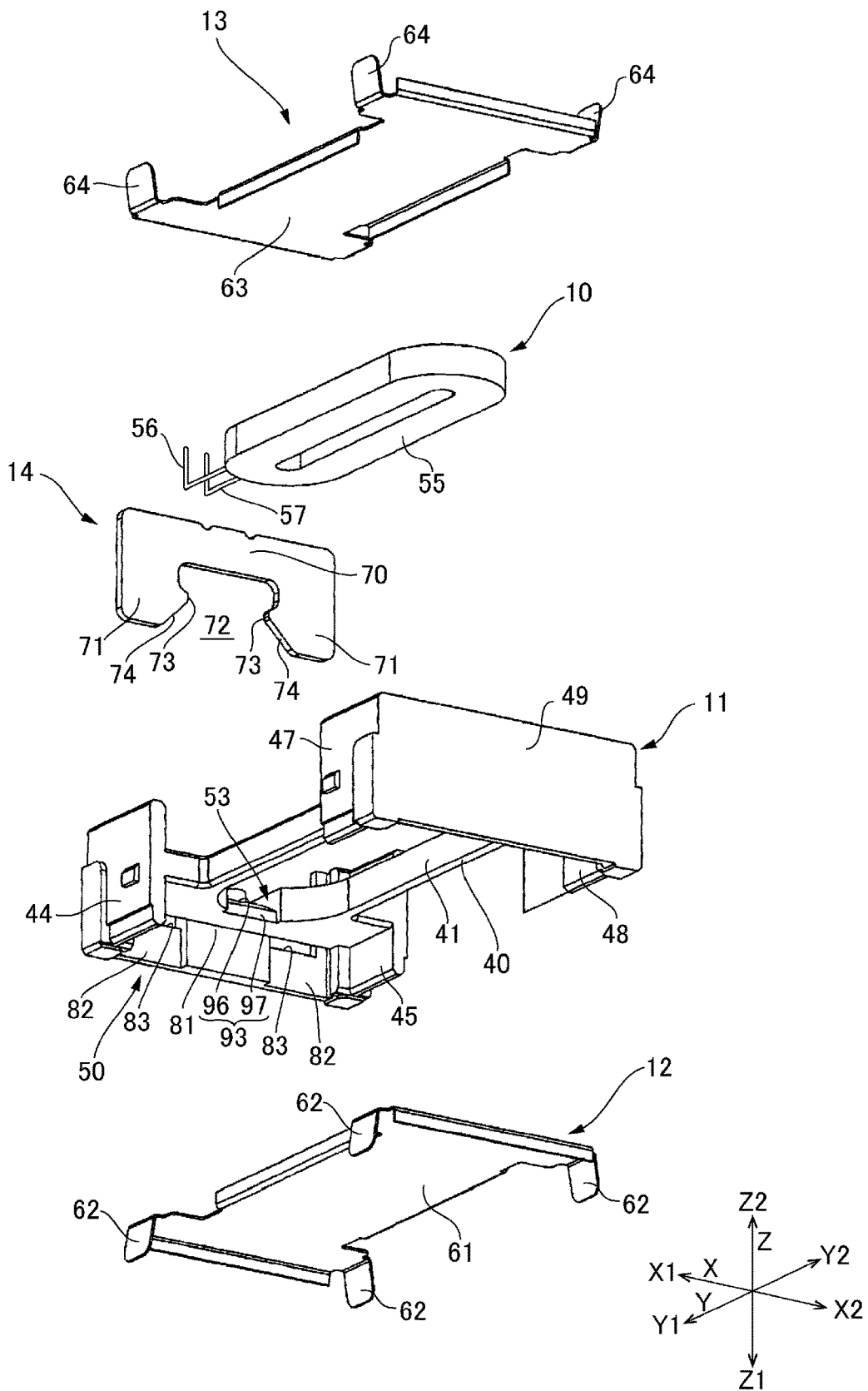
FIG. 6 is an exploded perspective view showing a support body in which a case is detached and which is viewed from an opposite side to FIG. 5.
Figure 7:
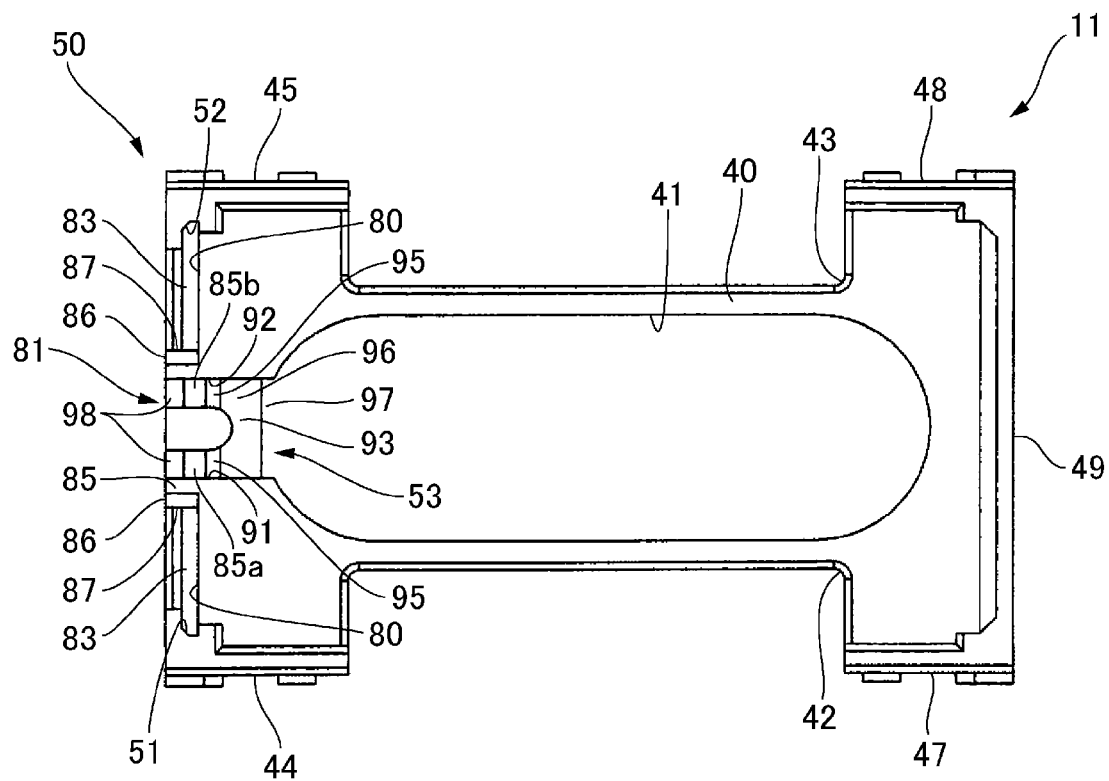
FIG. 7 is a plan view showing a coil holder.
Figure 7:
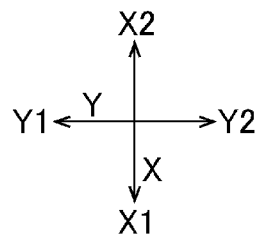

FIG. 1 is a perspective view showing an actuator to which the present invention is applied. FIG. 2 is a cross-sectional view showing an actuator which is cut in a longitudinal direction. FIG. 3 is an exploded perspective view showing an actuator. FIG. 4 is an exploded perspective view showing an actuator in which a case is detached. FIG. 5 is an exploded perspective view showing a support body in which a case is detached. FIG. 6 is an exploded perspective view showing a support body in which a case is detached and which is viewed from an opposite side to FIG. 5. FIG. 7 is a plan view showing a coil holder.

An actuator 1 in this embodiment is used as a tactile device for transmitting information by vibration. As shown in FIG. 1, the actuator 1 is provided with an outward appearance in a rectangular prism shape. The actuator 1 generates vibration in a shorter direction of the outward appearance. In the following descriptions, a shorter direction in which vibration is generated is referred to as an "X" direction (third direction), and a longitudinal direction of the actuator 1 which is a direction perpendicular to the "X" direction is referred to as a "Y" direction (second direction).

Further, in the following descriptions, a thickness direction of the actuator 1 which is a direction perpendicular to the "X" direction and the "Y" direction is referred to as a "Z" direction (first direction). The "X" direction, the "Y" direction and the "Z" direction are perpendicular to each other. Further, one side in the "X" direction is referred to as an "X1" direction side, and the other side is referred to as an "X2" direction side. One side in the "Y" direction is referred to as a "Y1" direction side, and the other side is referred to as a "Y2" direction side. One side in the "Z" direction is referred to as a "Z1" direction side, and the other side is referred to as a "Z2" direction side.

As shown in FIG. 2, the actuator 1 includes a support body 3 having a case 2 which forms an outer shape, and a movable body 5 which is accommodated in an inside of the case 2. Further, the actuator 1 includes a connection body 6 and a connection body 7 which connect the support body 3 with the movable body 5 relatively movably in the "X" direction, and a magnetic drive mechanism 8 which is structured to relatively move the movable body 5 and support body 3 in the "X" direction.

As shown in FIGS. 5 and 6, the support body 3 includes a coil 10, a coil holder 11 made of resin which holds the coil 10, a first plate 12 overlapped with the coil holder 11 on the "Z1" direction side, and a second plate 13 overlapped with the coil holder 11 on the "Z2" direction side. The coil 10 is provided with a winding part 55 which is structured of a coil wire wound around in an elliptical shape, and a first lead part 56 and a second lead part 57 which are extended in the "Y1" direction from an outer peripheral side of the winding part 55. A thickness direction of the coil 10 is directed in the "Z" direction. As shown in FIG. 2, the winding part 55 of the coil 10 is located at a center in the "Z" direction in the case 2.

Further, the support body 3 includes, as shown in FIGS. 1, 3 and 4, a power feeding circuit board 14 (board) which is held by an end face on the "Y1" direction side of the coil holder 11. The first lead part 56 and the second lead part 57 of the coil 10 are connected with a first land 15a and a second land 15b of a wiring pattern 15 provided on a board surface 14a of the power feeding circuit board 14. Electric power is supplied to the coil 10 through the power feeding circuit board 14.

The movable body 5 includes a magnet 16 and a yoke 17. The magnet 16 faces the winding part 55 of the coil 10 provided in the support body 3 in the "Z" direction. The coil 10 and the magnet 16 structure the magnetic drive mechanism 8. As shown in FIGS. 2 and 4, the connection body 6 and the connection body 7 are respectively members in a rectangular prism shape. Each of the connection body 6 and the connection body 7 is provided with at least one of elasticity and viscoelasticity.
(Movable Body)

As shown in FIGS. 3 and 4, the movable body 5 includes a first magnet 21 and a second magnet 22 as the magnet 16. The first magnet 21 is located on the "Z1" direction side with respect to the coil 10. The second magnet 22 is located on the "Z2" direction side with respect to the coil 10. Each of the first magnet 21 and the second magnet 22 is polarized into two portions in the "X" direction. A magnetized polarizing line of the first magnet 21 is extended in the "Y" direction at a center in the "X" direction. A magnetized polarizing line of the second magnet 22 is extended in the "Y" direction at a center in the "X" direction.

The yoke 17 is made of magnetic material. As shown in FIG. 4, the yoke 17 is structured by assembling two members, i.e., a first yoke 23 and a second yoke 24. The first yoke 23 is provided with a first plate part 25 in a flat plate shape which is long in the "Y" direction, and a pair of connection plate parts 26 which are curved to the "Z2" direction side from a center portion in the "Y" direction toward an outer side in the "X" direction and extended to the "Z2" direction side at both end edges in the "X" direction of the first plate part 25. The first magnet 21 is held by a face on the "Z2" direction side of the first plate part 25. The second yoke 24 is provided with a second plate part 27 which faces the first plate part 25 in the "Z" direction, and a pair of projecting parts 28 which are projected to the "X1" direction side and to the other "X2" direction side from an intermediate portion in the "Y" direction of the second plate part 27. The second magnet 22 is held by a face on the "Z1" direction side of the second plate part 27. A pair of the projecting parts 28 of the second yoke 24 are joined to tip end portions on the "Z2" direction side of a pair of the connection plate parts 26 by a method such as welding. As a result, the first yoke 23 and the second yoke 24 are integrated with each other as one body to structure the yoke 17.

(Support Body)

As shown in FIGS. 1 and 2, the case 2 includes a first case member 31 and a second case member 32 which are overlapped with each other in the "Z" direction. The first case member 31 is attached to the coil holder 11 from the "Z1" direction side. The second case member 32 is attached to the coil holder 11 from the "Z2" direction side. As shown in FIG. 3, the first case member 31 is provided with a first plate part 33 in a rectangular shape and four side plate parts 34 which are extended to the "Z2" direction side from both end edges in the "X" direction in an end portion on the "Y1" direction side of the first plate part 33 and from both end edges in the "X" direction in an end portion on the "Y2" direction side of the first plate part 33. Four side plate parts 34 are located on both sides in the "X" direction of the coil holder 11. The second case member 32 is provided with a second plate part 35 in a rectangular shape and a pair of side plate parts 36 which are extended to the "Z1" direction side from both end edges in the "X" direction of the second plate part 35. A pair of the side plate parts 36 are located on both sides in the "X" direction of the coil holder 11.

As shown in FIGS. 5 through 7, the coil holder 11 is provided with a plate part 40 which is extended in the "Y" direction. A coil arrangement hole 41 (coil holding part) is provided at a center of the plate part 40. The coil arrangement hole 41 is a through hole in an elliptical shape which is long in the "Y" direction. The coil arrangement hole 41 is formed in a shape to which the winding part 55 of the coil 10 is fitted. The winding part 55 is accommodated in the coil arrangement hole 41. Further, the coil holder 11 is provided with cut-out parts 42 and 43 which are formed by cutting out a center portion in the "Y" direction of the plate part 40 to an inner side.

Further, the coil holder 11 is provided on the "Y1" direction side of the cut-out parts 42 and 43 with a side plate part 44, which is protruded to the "Z1" direction side and to the "Z2" direction side from an edge on the "X1" direction side of the plate part 40, and a side plate part 45 which is protruded to the "Z1" direction side and to the "Z2" direction from an edge on the "X2" direction side of the plate part 40. In addition, the coil holder 11 is provided with a board support part 50 which supports the power feeding circuit board 14 in an end portion on the "Y1" direction side of the coil holder 11. The board support part 50 and the coil arrangement hole 41 are arranged in the "Y" direction. The power feeding circuit board 14 is supported by the board support part 50 in a posture that the board surface 14*a* formed with the first land 15*a* and the second land 15*b* faces the "Y1" direction side.

In addition, the coil holder 11 is provided on the "Y2" direction side of the cut-out parts 42 and 43 with a side plate part 47, which is protruded to the "Z1" direction side and to the "Z2" direction side from an edge on the "X1" direction side of the plate part 40, and a side plate part 48 which is protruded to the "Z1" direction side and to the "Z2" direction from an edge on the "X2" direction side of the plate part 40. Further, the coil holder 11 is provided with a side plate part 49 which is protruded to the "Z1" direction side and to the "Z2" direction side from an end edge on the "Y2" direction side of the plate part 40 and connects an end on the "Y2" direction side of the side plate part 47 with an end on the "Y2" direction side of the side plate part 48.

Further, the coil holder 11 is provided with a guide groove 53 which is extended from the coil arrangement hole 41 toward the board support part 50 on a face on the "Z2" direction side of the plate part 40. The first lead part 56 and the second lead part 57 extended to the "Y1" direction side from the winding part 55 of the coil 10 are put in the guide groove 53 and connected with the power feeding circuit board 14.

In this embodiment, as shown in FIGS. 5 and 6, the power feeding circuit board 14 is provided with a wiring connection part 70 in a rectangular shape which is long in the "X" direction when viewed in the "Y" direction, and a pair of leg parts 71 which are protruded to the "Z1" direction side from both end portions in the "X" direction of the wiring connection part 70. As a result, the power feeding circuit board 14 is provided on the "Z1" direction side of the wiring connection part 70 with a cut-out opening 72 which is sectioned by a pair of the leg parts 71 and the wiring connection part 70. As shown in FIG. 5, the wiring connection part 70 is formed with the wiring pattern 15. The wiring pattern 15 is provided with the first land 15*a* and the second land 15*b*. A pair of the leg parts 71 are provided with a pair of protruded parts 73 which are protruded to an inner side in the "X" direction at a midway position in the "Z" direction. As shown in FIG. 6, edges on an inner side of a pair of the leg parts 71 facing each other in the "X" direction are respectively provided with inclined edge portions 74 which are inclined in a direction separated from each other from the protruded parts 73 toward the "Z1" direction side.

As shown in FIGS. 5 and 7, the circuit board support part 50 is provided with a pair of slits 51 and 52 on an end part on the "Y1" direction side of the side plate parts 44 and 45 facing each other in the "X" direction. Each of a pair of the slits 51 and 52 is extended in the "Z" direction. Each of a pair of the slits 51 and 52 is opened to the "Z2" direction side. Further, the board support part 50 is provided with a pair of cut-out recessed parts 80 which are recessed to the "Z1" direction side and to the "Y2" direction side on both end portions in the "X" direction in an end portion on the "Y1" direction side of the plate part 40. As a result, the board support part 50 is provided with a protruded part 81 (insertion part) in a center portion in the "X" direction of the end portion on the "Y1" direction side of the plate part 40. In addition, the board support part 50 is, as shown in FIG. 5, provided with a connection plate part 82 which is extended in the "X" direction on the "Z1" direction side of a pair of the cut-out recessed parts 80 and connect an end portion on the "Z1" direction side of the side plate part 44 with an end portion on the "Z1" direction side of the side plate part 45. A center portion in the "X" direction of the connection plate part 82 is continuously connected with the protruded part 81.

Further, the board support part 50 is provided with a pair of circuit board insertion holes 83 which penetrate through to the "Z1" direction side on inner wall faces on the "Z1" direction side of a pair of the cut-out recessed parts 80.

The protruded part 81 is provided with a tip end face 85 which faces the "Z2" direction side. Further, the protruded part 81 is provided with a pair of inclined faces 86 which are inclined to the "Z1" direction side toward a direction separated from the tip end face 85 in the "X" direction on both sides in the "X" direction of the tip end face 85. The tip end face 85 is provided with a first recessed part 85a and a second recessed part 85b at two positions separated from each other in the "X" direction. Further, the protruded part 81 is provided with a pair of side faces 87 which are extended to the "Z1" direction side from ends of the respective inclined faces 86 on an opposite side to the tip end face 85. A pair of the side faces 87 are extended parallel to the "Z" direction.

As shown in FIG. 4, the power feeding circuit board 14 is supported by the board support part 50 by inserting respective both end edges in the "X" direction into the respective slits 51 and 52 from the "Z2" direction side. The protruded part 81 of the plate part 40 provided between a pair of the cut-out recessed parts 80 is an insertion part which is inserted into the cut-out opening 72 of the power feeding circuit board 14 from the "Z1" direction side when the power feeding circuit board 14 is supported by the board support part 50. Further, when the power feeding circuit board 14 is to be supported by the board support part 50, tip end portions of the respective leg parts 71 of the power feeding circuit board 14 are inserted into a pair of the circuit board insertion holes 83.

When the power feeding circuit board 14 is supported by the board support part 50, the tip end face 85 of the protruded part 81 is abutted with the wiring connection part 70. In this embodiment, the first recessed part 85a and the second recessed part 85b provided on the tip end face 85 of the protruded part 81 are overlapped with the power feeding circuit board 14 when viewed in the "Z" direction (direction along the circuit board surface 14a). Further, the first recessed part 85a is located on the "Z1" direction side with respect to the first land 15a, and the second recessed part 85b is located on the "Z1" direction side with respect to the second land 15b.

The respective protruded parts 73 provided in a pair of the leg parts 71 of the power feeding circuit board 14 face each other in the "X" direction in a state before the protruded part 81 is inserted into the cut-out opening 72, and a distance between the two protruded parts 73 in the "X" direction is narrower than a width of the protruded part 81 in the "X" direction. In other words, in a state before the protruded part 81 is inserted into the cut-out opening 72 of the power feeding circuit board 14, the distance between the two protruded parts 73 in the "X" direction is narrower than a distance between a pair of the side faces 87 of the protruded part 81. Therefore, the protruded part 81 is press-fitted to a pair of the leg parts 71 when the feeding circuit board 14 is supported by the board support part 50. In other words, the tip end of each of the protruded parts 73 of a pair of the leg parts 71 becomes a press fitting margin when the protruded part 81 is inserted into the cut-out opening 72 of the power feeding circuit board 14. Therefore, in a state that the power feeding circuit board 14 is supported by the board support part 50, at least one of the tip end of the protruded part 73 and the side face 87 of the protruded part 81 becomes a scraped state by contacting with the other of the tip end of the protruded part 73 and the side face 87 of the protruded part 81. In this embodiment, the coil holder 11 is made of resin and is softer than the power feeding circuit board 14 and thus, the respective side faces 87 of the protruded part 81 are scraped by the tip ends of the respective protruded parts 73 of the power feeding circuit board 14.

As shown in FIGS. 5 and 7, the guide groove 53 communicates with the respective recessed parts 85a and 85b of the circuit board support part 50 and the coil arrangement hole 41. The guide groove 53 is provided with a one side groove portion 91, which is extended from an end on the "Y1" direction side of the plate part 40 in a straight line shape via the first recessed part 85a, the other side groove portion 92 extended from the end on the "Y1" direction side of the plate part 40 in parallel with the one side groove portion 91 via the second recessed part 85b, and a common groove portion 93 which communicates an end on the "Y2" direction side of the one side groove portion 91 and an end on the "Y2" direction side of the other side groove portion 92 with the coil arrangement hole 41. Further, when a cross section passing in the "Y" direction of the other side groove portion 92 and the common groove portion 93 is viewed, the guide groove 53 is provided with a first groove portion 95 connected with the second recessed part 85b in a depth shallower than the second recessed part 85b, a second groove portion 96 which is extended from the first groove portion 95 toward the coil arrangement hole 41 so as to be deepened as approaching the coil arrangement hole 41, a third groove portion 97 which connects the second groove portion 96 with the coil arrangement hole 41, and a fourth groove portion 98 which is extended from the recessed part 85b to an end on the "Y1" direction side of the plate part in a depth shallower than the first groove portion 95 (see FIG. 9B). The third groove portion 97 is provided by cutting out the plate part 40 from the coil arrangement hole 41 to the "Y1" direction side and penetrates through the plate part 40 in the "Z" direction. Similarly, when a cross section passing in the "Y" direction of the one side groove portion 91 and the common groove portion 93 is viewed, the guide groove 53 is provided with a first groove portion 95 connected with the first recessed part 85a in a depth shallower than the first recessed part 85a, a second groove portion 96 which is extended from the first groove portion 95 toward the coil arrangement hole 41 so as to be deepened as approaching the coil arrangement hole 41, a third groove portion 97 which connects the second groove portion 96 with the coil arrangement hole 41, and a fourth groove portion 98 which is extended from the recessed part 85a to an end on the "Y1" direction side of the plate part in a depth shallower than the first groove portion 95. The third groove portion 97 is provided by cutting out the plate part 40 from the coil arrangement hole 41 to the "Y1" direction side and penetrates through the plate part 40 in the "Z" direction.

In this embodiment, as shown in FIGS. 1, 3 and 4, the first lead part 56 extended to the "Y1" direction side from the winding part 55 of the coil 10 is extended to the "Y1" direction side along the common groove portion 93 and the one side groove portion 91 of the guide groove 53 and passes to the "Y1" direction side between the wiring connection part 70 of the power feeding circuit board 14 and the plate part 40 (tip end face 85 of the protruded part 81). Then, the first lead part 56 is bent to the "Z2" direction side in an inside of the first recessed part 85a and is electrically connected with the first land 15a of the power feeding circuit board 14. The first lead part 56 is provided with a resiliently bent portion 56a which is resiliently bent in the inside of the first recessed part 85a. Similarly, the second lead part 57 extended to the "Y1" direction side from the winding part 55 of the coil 10 is extended to the "Y1" direction side along the common groove portion 93 and the other side groove portion 92 of the guide groove 53 and passes to the "Y1" direction side between the wiring connection part 70 of the power feeding circuit board 14 and the plate part 40 (tip end face 85 of the protruded part 81). Then, as shown in FIG. 2, the second lead part 57 is bent to the "Z2" direction side in an inside of the second recessed part 85b and is electrically connected with the second land 15b of the power feeding circuit board 14. The second lead part 57 is provided with a resiliently bent portion 57a which is resiliently bent in the inside of the second recessed part 85b.

The first plate 12 is, as shown in FIGS. 5 and 6, provided with a first plate part 61 in a rectangular shape which covers the plate part 40 from the "Z1" direction side, and a plurality of first claw parts 62 which are obliquely protruded to the "Z1" direction side from both sides in the "X" direction of the first plate part 61 toward an outer side in the "X" direction. When the first plate 12 is contacted with the plate part 40 of the coil holder 11 from the "Z1" direction side, the first claw parts 62 are elastically abutted with the side plate part 44, the side plate part 45, the side plate part 47 and the side plate part 48.

Further, the second plate 13 is provided with a second plate part 63 in a rectangular shape which covers the plate part 40 from the "Z2" direction side, and a plurality of second claw parts 64 which are obliquely protruded to the "Z2" direction side from both sides in the "X" direction of the second plate part 63 toward an outer side in the "X" direction. When the second plate 13 is contacted with the plate part 40 of the coil holder 11 from the "Z2" direction side, the second claw parts 64 are elastically abutted with the side plate part 44, the side plate part 45, the side plate part 47 and the side plate part 48. The first plate 12 and the second plate 13 are fixed to the coil holder 11 by an adhesive.

(Connection Body)

As shown in FIGS. 2 and 4, each of the connection bodies 6 and 7 is formed in a rectangular prism shape which is extended long in the "X" direction. The connection body 6 is disposed between the first yoke 23 and the first plate 12. More specifically, the connection body 6 is structured of two members having the same shape and is sandwiched at two positions, i.e., between an end portion on the "Y1" direction side of the first yoke 23 and an end portion on the "Y1" direction side of the first plate 12, and between an end portion on the "Y2" direction side of the first yoke 23 and an end portion on the "Y2" direction side of the first plate 12. The connection body 7 is disposed between the second yoke 24 and the second plate 13. More specifically, the connection body 7 is structured of two members having the same shape and is sandwiched at two positions, i.e., between an end portion on the "Y1" direction side of the second yoke 24 and an end portion on the "Y1" direction side of the second plate 13, and between an end portion on the "Y2" direction side of the second yoke 24 and an end portion on the "Y2" direction side of the second plate 13. The connection bodies 6 and 7 are gel members made of silicone gel. Each of the connection body 6 and the connection body 7 is set in a compressed state in the "Z" direction between the support body 3 and the movable body 5.

In this embodiment, in a state that the movable body 5 is supported by the support body 3 through the connection bodies 6 and 7, the winding part 55 of the coil 10 is disposed between the first magnet 21 and the second magnet 22 in the "Z" direction. When this state is viewed in the "Z" direction, the winding part 55 faces the first magnet 21 on the "Z1" direction side and faces the second magnet 22 on the "Z2" direction side. Further, both end portions in the "Y" direction of the first plate part 25 of the first yoke 23 and both end portions in the "Y" direction of the second plate part 27 of the second yoke 24 are disposed between the side plate part 44 and the side plate part 45 and between the side plate part 47 and the side plate part 48 of the coil holder 11 in the "X" direction. In addition, a pair of the connection plate parts 26 of the yoke 17 are located in inner sides of the cut-out parts 42 and 43. The side plate part 44, the side plate part 45, the side plate part 47 and the side plate part 48 of the coil holder 11 function as abutting parts which restrict a movable range when the movable body 5 is moved in the "X" direction.

(Operation)

Wiring lines from a device on which the actuator 1 is mounted are connected with the wiring pattern 15 of the power feeding circuit board 14. In this embodiment, when an electric current is supplied to the coil 10 in a predetermined direction through the power feeding circuit board 14, the movable body 5 supported by the support body 3 is moved to one side in the "X" direction. After that, when the direction of the electric current is reversed, the movable body 5 is moved to the other side in the "X" direction. When the direction of the electric current supplied to the coil 10 is repeatedly reversed, the movable body 5 is vibrated.

(Fixing Method of Coil to Coil Holder)

Figure 8:
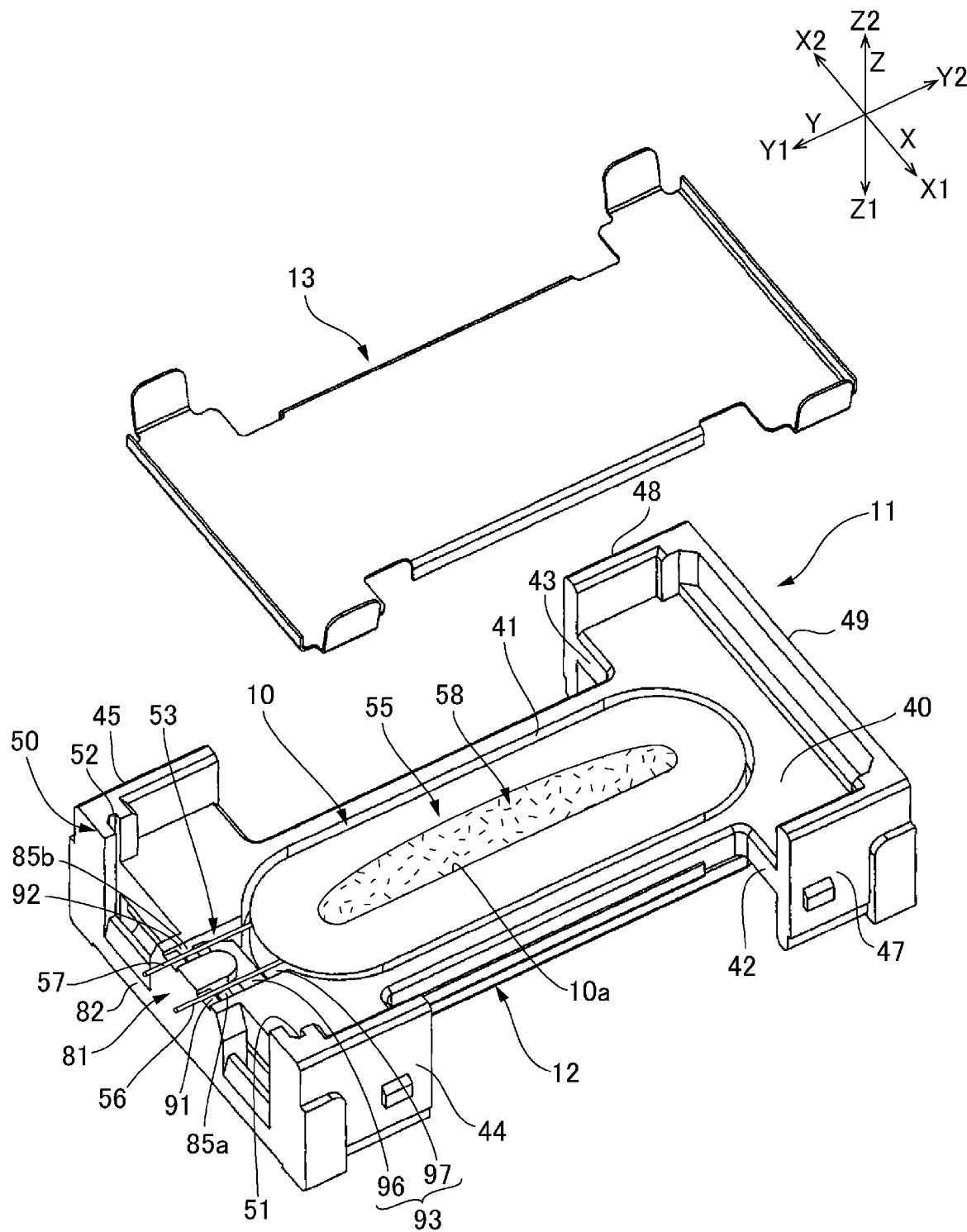
FIG. 8 is an explanatory view showing a fixing method of a coil to a coil holder.

Next, a fixing method of the coil 10 to the coil holder 11 will be described below. FIG. 8 is an explanatory view showing a fixing method of the coil 10 to the coil holder 11. As shown in FIG. 8, when the coil 10 is to be fixed to the coil holder 11, the first plate 12 is overlapped with the plate part 40 of the coil holder 11 from the "Z1" direction side. As a result, the first plate 12 is supported by the coil holder 11 in a state that the coil arrangement hole 41 is closed by the first plate 12 from the "Z1" direction side.

Next, the winding part 55 of the coil 10 is disposed in the coil arrangement hole 41. Then, an adhesive 58 is filled in a center hole 10a of the winding part 55. After that, the second plate 13 is overlapped with the plate part 40 of the coil holder 11 from the "Z2" direction side, and the second plate 13 is supported by the coil holder 11.

The adhesive 58 filled in the center hole 10a of the winding part 55 enters between the winding part 55 and the first plate 12 on the "Z1" direction side of the winding part 55 to flow into a gap space between the first plate 12 and the plate part 40 of the coil holder 11 and, in addition, flow between the winding part 55 and an inner wall face of the coil arrangement hole 41. Further, the adhesive 58 enters between the winding part 55 and the second plate 13 on the "Z2" direction side of the winding part 55 to flow into a gap space between the second plate 13 and the plate part 40 of the coil holder 11 and, in addition, flow between the winding part 55 and the inner wall face of the coil arrangement hole 41. Therefore, as shown in FIG. 2, when the adhesive 58 is cured, the winding part 55 is fixed to the inner wall face of the coil arrangement hole 41 of the plate part 40 by an adhesive layer 59 which is a cured adhesive 58. Further, the first plate 12 is fixed to the plate part 40 of the coil holder 11 by the adhesive layer 59. In addition, the second plate 13 is fixed to the plate part 40 of the coil holder 11 by the adhesive layer 59.

In this embodiment, although the adhesive 58 filled in the center hole 10a of the winding part 55 flows to a side of the guide groove 53, the adhesive 58 is limited to the common groove portion 93 connected with the coil arrangement hole 41. In other words, the adhesive 58 is limited, in the common groove portion 93, to the third groove portion 97 which communicates with the coil arrangement hole 41 and penetrates in the "Z" direction, or to the second groove portion 96 which is located on the "Y1" direction side of the third groove portion 97 and is deepened as approaching the coil arrangement hole 41. Therefore, the adhesive 58 does not flow to the "Y1" direction side with respect to the first groove portion 95. Accordingly, the adhesive layer 59 where the adhesive 58 has been cured is not provided between the resiliently bent portions 56a and 57a of the lead parts 56 and 57 and inner wall faces of the recessed parts 85a and 85b.

(Connection Method of Coil with Power Feeding Circuit Board)

Figure 9A:
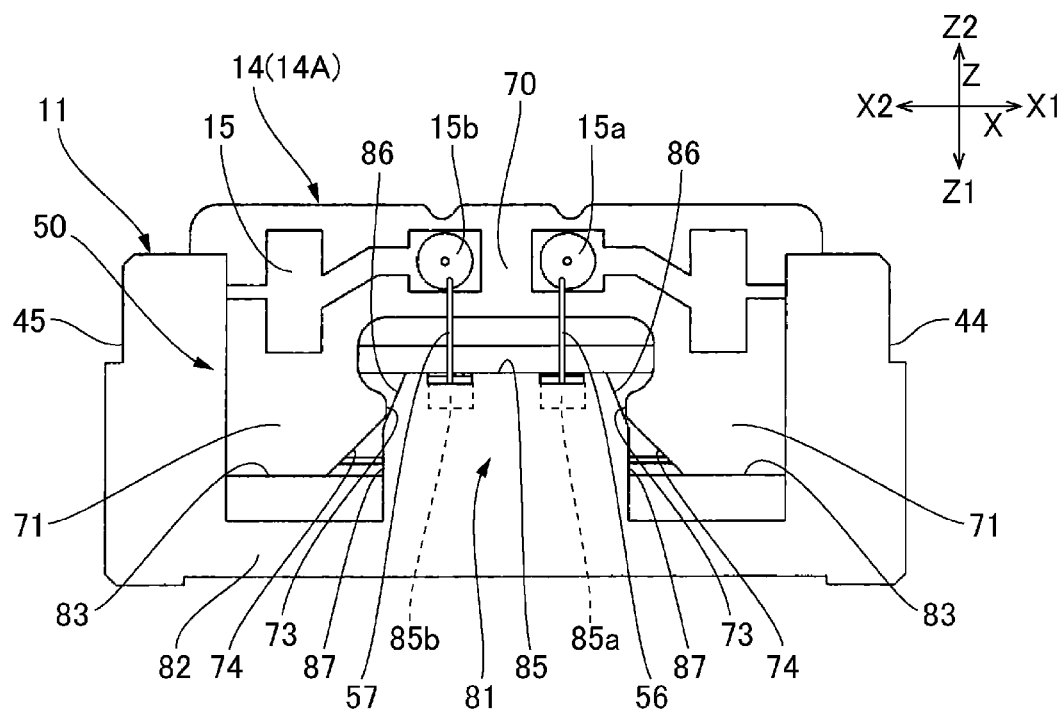
FIGS. 9A and 9B are explanatory views showing a connection method of a power feeding circuit board with a coil.
Figure 9B:
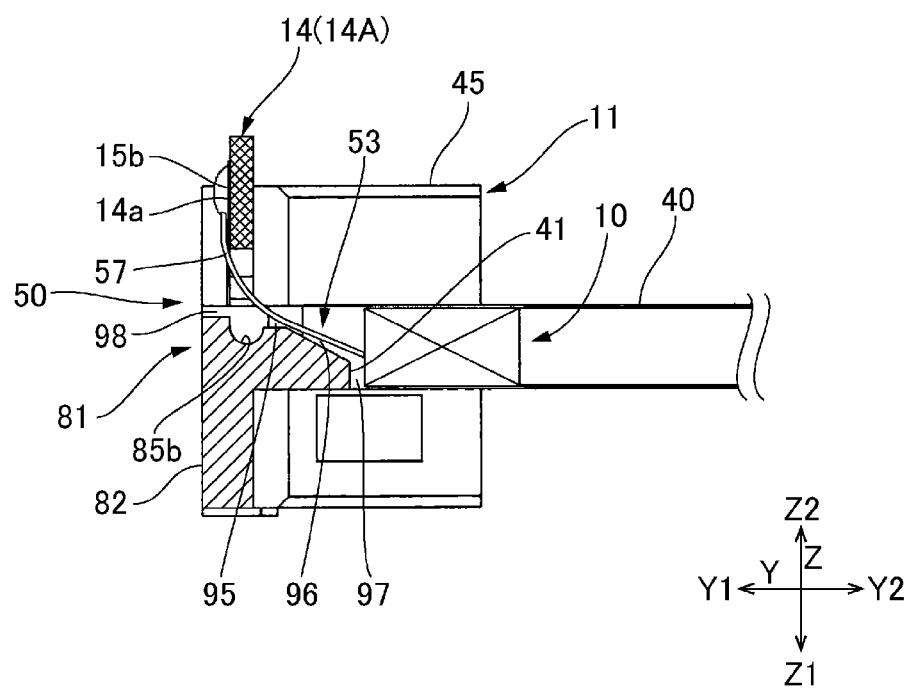
Figure 10A:
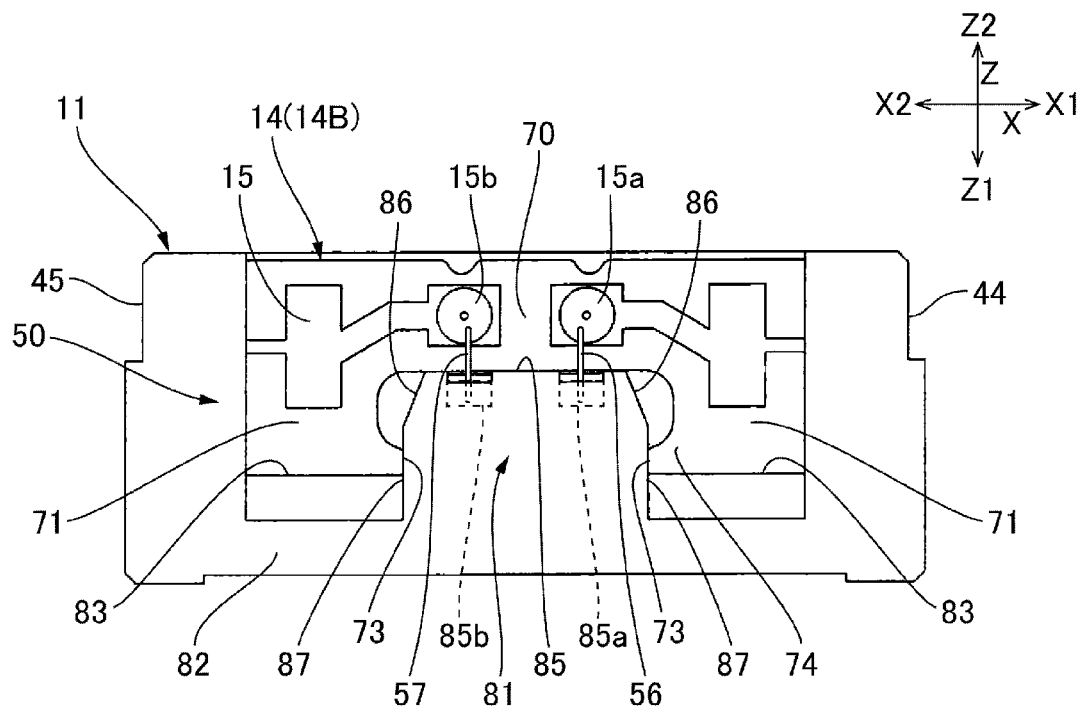
FIGS. 10A and 10B are explanatory views showing a state that connection of a power feeding circuit board with a coil has been completed.
Figure 10B:
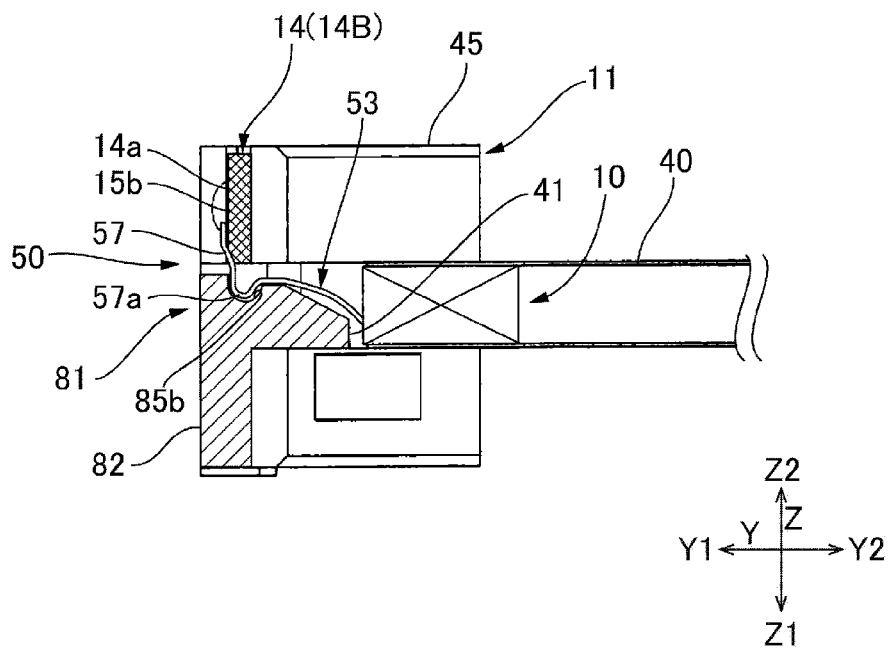

Next, a connection method of the coil 10 held by the coil holder 11 with the power feeding circuit board 14 will be described below with reference to FIGS. 9A and 9B and FIGS. 10A and 10B. FIGS. 9A and 9B are explanatory views showing a state that the respective lead parts are connected with the power feeding circuit board 14 which is located at a temporary support position. FIGS. 10A and 10B are explanatory views showing a state that the power feeding circuit board 14 which is connected with the respective lead parts is moved from the temporary support position to a support position. FIGS. 9A and 10A are front views showing the power feeding circuit board 14 and the coil holder 11 which are viewed from the "Y1" direction side, and FIGS. 9B and 10B are cross-sectional views showing states that the power feeding circuit board 14 and the coil holder 11 are cut along the "Y" direction at the other side groove portion 92 and the common groove portion 93.

Connection of the coil 10 with the power feeding circuit board 14 is performed in a state that the winding part 55 of the coil 10 is accommodated in the coil arrangement hole 41. In this state, the first lead part 56 and the second lead part 57 of the coil 10 are extended to the "Y1" direction side along the guide groove 53. A tip end portion of the first lead part 56 and a tip end portion of the second lead part 57 are respectively extended to the "Y1" direction side with respect to the first recessed part 85a and the second recessed part 85b of the circuit board support part 50.

When the coil 10 and the power feeding circuit board 14 are to be connected with each other, first, the power feeding circuit board 14 is disposed on the "Z2" direction side of the board support part 50 and set in a posture that the circuit board surface 14a faces the "Y1" direction side. After that, both end edges in the "X" direction of the power feeding circuit board 14 are inserted into a pair of the slits 51 and 52. Further, the protruded part 81 (insertion part) is inserted into the cut-out opening 72 of the power feeding circuit board 14, and the power feeding circuit board 14 is supported at the temporary support position 14A where each of a pair of the protruded parts 73 is contacted with each of the inclined faces 86 of the protruded part 81 and a gap space is formed between the wiring connection part 70 and the tip end face 85. This state is the state shown in FIGS. 9A and 9B, and a space is formed between the plate part 40 of the coil holder 11 and the wiring connection part 70 of the power feeding circuit board 14. Further, the tip end portion of the first lead part 56 and the tip end portion of the second lead part 57 are passed through the space to the "Y1" direction side.

In this state, the first lead part 56 and the second lead part 57 are connected with the first 1 and 15a and the second land 15b of the power feeding circuit board 14 which is disposed at the temporary support position 14A. When the lead parts 56 and 57 are respectively connected with the lands 15a and 15b, as shown in FIG. 9B, the lead parts 56 and 57 are respectively extended in an inside of the guide groove 53 to the "Y1" direction side and, after the lead parts 56 and 57 have passed through the "Z1" direction side of the recessed parts 85a and 85b, the lead parts 56 and 57 are curved to the "Z2" direction side along a lower end edge of the wiring connection part 70 of the power feeding circuit board 14.

Next, the power feeding circuit board 14 located at the temporary support position 14A is pushed to the "Z1" direction side. Then, as shown in FIGS. 10A and 10B, the power feeding circuit board 14 is located at the support position 14B where a pair of the protruded parts 73 provided in a pair of the leg parts 71 are respectively contacted with a pair of the side faces 87 of the protruded part 81 (insertion part), and the tip end face 85 of the protruded part 81 is abutted with the wiring connection part 70. In this embodiment, the tip ends of the respective protruded parts 73 provided in the leg parts 71 serves as press fitting margins when the power feeding circuit board 14 is inserted to the protruded part 81. Therefore, while the power feeding circuit board 14 located at the temporary support position 14A is moved to the support position 14B, the protruded part 81 is press-fitted to the cut-out opening 72 of the power feeding circuit board 14. Further, each of the side faces 87 of the protruded part 81 is scraped by the tip end of each of the protruded parts 73.

Further, when the power feeding circuit board 14 located at the temporary support position 14A is press-fitted to the support position 14B, the respective lead parts 56 and 57 are resiliently bent to the "Z1" direction side with respect to the power feeding circuit board 14 as the power feeding circuit board 14 is moved to the "Z1" direction side. Further, as a result, the resiliently bent portions 56a and 57a of the respective lead parts 56 and 57 are accommodated in the respective recessed parts 85a and 85b. Therefore, the respective lead parts 56 and 57 are provided with the resiliently bent portions 56a and 57a which are resiliently bent in the insides of the recessed parts 85a and 85b.

(Operations and Effects)

According to this embodiment, the winding part 55 of the coil 10 and the power feeding circuit board 14 are fixed to the coil arrangement hole 41 and the board support part 50 which are provided in the coil holder 11. Further, the lead parts 56 and 57 of the coil 10 which are extended from the winding part 55 of the coil 10 and connected with the lands 15a and 15b of the power feeding circuit board 14 are provided with the resiliently bent portions 56a and 57a between the winding part 55 and the lands 15a and 15b. Therefore, in a case that tensile force is applied to the lead parts 56 and 57 due to an impact or a thermal change, the resiliently bent portions 56a and 57a are extended and elongated and thus, the lead parts 56 and 57 are prevented from being pulled between the power feeding circuit board 14 and the winding part 55. As a result, the lead parts 56 and 57 are prevented or restrained from disconnecting.

In this embodiment, the coil 10 and the power feeding circuit board 14 are held by the coil holder 11, and the resiliently bent portions 56a and 57a are arranged in the insides of the recessed parts 85a and 85b which are provided in the coil holder 11. Therefore, the resiliently bent portions 56a and 57a can be prevented or restrained from moving on the coil holder 11 to interfere with other members.

In addition, the recessed parts 85a and 85b are provided in the board support part 50 at a position overlapping with the power feeding circuit board 14 when viewed in a direction along the board surface 14a of the power feeding circuit board 14. As a result, the recessed parts 85a and 85b are provided in the vicinity of tip end portions of the lead parts 56 and 57 which are connected with the lands 15a and 15b of the power feeding circuit board 14. Therefore, when tensile force is applied to the lead parts 56 and 57, an excessive load is easily restrained from applying to the tip end portions of the lead parts 56 and 57 which are fixed to the lands 15a and 15b by solder.

Further, in this embodiment, the adhesive layer 59 fixing the coil 10 to the coil holder 11 is provided between the winding part 55 and the coil arrangement hole 41. However, the adhesive layer 59 is not provided between the resiliently bent portions 56a and 57a and the inner wall faces of the recessed parts 85a and 85b. Therefore, when tensile force is applied to the lead parts 56 and 57 due to an impact or a thermal change, the resiliently bent portions 56a and 57a can be freely moved. Accordingly, the lead parts 56 and 57 are easily prevented from disconnecting.

Further, in this embodiment, the coil holder 11 is provided with the guide groove 53 which guides the lead parts 56 and 57. The guide groove 53 communicates with the recessed parts 85a and 85b and the coil arrangement hole 41. Therefore, the lead parts 56 and 57 extended from the winding part 55 can be routed so as to go via the recessed parts 85a and 85b.

In addition, the guide groove 53 is provided with the first groove portion 95, which is connected with the recessed parts 85a and 85b in a depth shallower than the recessed parts 85a and 85b, and the second groove portion 96 which is extended from the first groove portion 95 toward the coil arrangement hole 41 so as to deepen as approaching the coil arrangement hole 41. Therefore, in comparison with a case that a deep guide groove 53 connects between the coil arrangement hole 41 and the recessed parts 85a and 85b, a thickness of the portion of the coil holder 11 where the guide groove 53 is formed can be secured. As a result, rigidity of the coil holder 11 is easily secured. Further, the first groove portion 95 connected with the recessed parts 85a and 85b is shallower than the recessed parts 85a and 85b and thus, the adhesive 58 for fixing the winding part 55 of the coil 10 to the coil holder 11 can be prevented or restrained from reaching the recessed parts 85a and 85b from the coil arrangement hole 41. As a result, the adhesive layer 59 can be avoided being provided between the lead parts 56 and 57 and the recessed parts 85a and 85b.

Further, in this embodiment, the power feeding circuit board 14 is provided with the wiring connection part 70 having the lands 15a and 15b, and a pair of the leg parts 71 which are protruded to one side in the first direction from both end portions in the "X" direction of the wiring connection part 70. The circuit board support part 50 is provided with a pair of the slits 51 and 52 into which the respective both end edges in the "X" direction of the power feeding circuit board 14 are inserted from the other side in the first direction, and the protruded part 81 which is inserted from the one side in the first direction to the cut-out opening 72 of the power feeding circuit board 14 sectioned by a pair of the leg parts 71 and the wiring connection part 70. The protruded part 81 is provided with the tip end face 85 which is abutted with the wiring connection part 70, and the recessed parts 85a and 85b are provided on the tip end face 85. Therefore, when viewed in a direction along the board surface 14a, the recessed parts 85a and 85b are easily provided at positions overlapping with the power feeding circuit board 14.

In this embodiment, a pair of the leg parts 71 of the power feeding circuit board 14 are provided with a pair of the protruded parts 73 which are contacted with the protruded part 81 from both sides in the "X" direction. Further, in a state before the protruded part 81 is inserted into the cut-out opening 72, a pair of the protruded parts 73 of the power feeding circuit board 14 face each other in the "X" direction, and a distance in the "X" direction between the two protruded parts 73 is narrower than a width in the "X" direction of the protruded part 81. Therefore, when the protruded part 81 is inserted into the cut-out opening 72 of the power feeding circuit board 14, the protruded part 81 is press-fitted to the cut-out opening 72. In other words, a pair of the protruded parts 73 serve as a press fitting margin when the protruded part 81 is inserted into the cut-out opening 72. As a result, the power feeding circuit board 14 is easily supported by the board support part 50.

Further, the protruded part 81 is provided with a pair of the inclined faces 86, which are inclined in a direction separating from the wiring connection part 70 toward a direction separating from the tip end face 85 on both sides in the "X" direction of the tip end face 85, and a pair of the side faces 87 which are extended in the first direction from ends of the respective inclined faces 86 on an opposite side to the tip end face 85 to an opposite side with respect to the wiring connection part 70. Further, in the state before the protruded part 81 is inserted into the cut-out opening 72, a distance between the two protruded parts 73 facing each other in the "X" direction is wider than a width in the "X" direction of the tip end face 85 and is narrower than a distance in the "X" direction between a pair of the side faces 87. Therefore, the protruded part 81 is easily press-fitted into the cut-out opening 72 of the power feeding circuit board 14.

Further, in this embodiment, when the respective lead parts 56 and 57 of the coil 10 are to be connected with the power feeding circuit board 14, the lead parts 56 and 57 are connected with the power feeding circuit board 14 in a state that the power feeding circuit board 14 is disposed at the temporary support position 14A and, after that, the power feeding circuit board 14 is pushed to the "Z1" direction side and is disposed at the support position 14B. In this case, when the power feeding circuit board 14 is moved to the support position 14B from the temporary support position 14A, resiliently bent portions are formed in the lead parts 56 and 57 which are connected with the power feeding circuit board 14. Further, the resiliently bent portions are accommodated in the recessed parts 85a and 85b located on the "Z1" direction side with respect to the power feeding circuit board 14. Therefore, the lead parts 56 and 57 are easily provided with the resiliently bent portions 56a and 57a which are resiliently bent in the insides of the recessed parts 85a and 85b.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a support body comprising:
      a coil comprising a winding part and a lead part extended from the winding part;
      a coil holder which holds the coil; and
      a board which is supported by the coil holder;
   a movable body comprising a magnet facing the winding part;

a connection body which relatively movably connects the movable body with the support body; and
a magnetic drive mechanism which comprises the coil and the magnet and is structured to relatively move the support body and the movable body;
wherein the coil holder comprises a coil holding part which holds the winding part and a board support part which supports the board on an outer side in a radial direction of the coil holding part;
wherein the coil holding part is a hole which accommodates the winding part;
wherein the coil holder comprises a guide groove which guides the lead part, and the guide groove communicates with the coil holding part;
wherein a board surface of the board comprises a land with which the lead part is connected;
wherein the board support part comprises a recessed part at a position overlapping with the board when viewed in a direction along the board surface and at a position communicating with the guide groove;
wherein the guide groove comprises a first groove portion which is connected with the recessed part in a depth shallower than the recessed part;
wherein the recessed part is recessed from the first groove portion to an opposite side to the land; and
wherein the lead part is extended from the winding part to the land via the recessed part and comprises a resiliently bent portion which is deformably disposed in an inside of the recessed part on the opposite side to the land with respect to the first groove portion.

2. The actuator according to claim 1, further comprising an adhesive layer which fixes the coil to the coil holder,
wherein the adhesive layer is provided between the winding part and the coil holding part without being provided between the resiliently bent portion and an inner wall face of the recessed part.

3. The actuator according to claim 1, wherein the guide groove comprises:
a second groove portion which is extended from the first groove portion toward the coil holding part and is deepened as approaching the coil holding part.

4. The actuator according to claim 1, wherein in a case that a direction where the winding part and the magnet face each other is defined as a first direction, and two directions perpendicular to the first direction and perpendicular to each other are defined as a second direction and a third direction,
the coil holding part and the board support part are arranged in the second direction,
the board surface faces an opposite side to the coil holding part in the second direction,
the board comprises:
a wiring connection part comprising the land; and
a pair of leg parts which are protruded to one side in the first direction from both end portions in the third direction of the wiring connection part,
the board support part comprises:
a pair of slits into which both end edges in the third direction of the board are respectively inserted from an other side in the first direction; and
an insertion part which is inserted from the one side in the first direction to a cut-out opening of the board sectioned by the pair of the leg parts and the wiring connection part,
the insertion part comprises a tip end face which is abutted with the wiring connection part, and
the recessed part is provided on the tip end face.

5. The actuator according to claim 4, wherein
the coil holder is made of resin,
the pair of the leg parts comprise a pair of protruded parts which are contacted with the insertion part from both sides in the third direction,
in a state before the insertion part is inserted to the cut-out opening, the pair of the protruded parts face each other in the third direction, and
a distance in the third direction between the protruded parts is narrower than a width in the third direction of the insertion part.

6. The actuator according to claim 5, wherein
the insertion part comprises:
a pair of inclined faces which are inclined in a direction separated from the wiring connection part toward a direction separated from the tip end face on both sides in the third direction of the tip end face; and
a pair of side faces which are extended to an opposite side with respect to the wiring connection part in the first direction from ends of the inclined faces on an opposite side to the tip end face, and
in a state before the insertion part is inserted to the cut-out opening, a distance of the protruded parts facing each other in the third direction is wider than a width in the third direction of the tip end face and is narrower than a distance in the third direction between the pair of the side faces.

7. An actuator comprising:
a support body comprising:
a coil comprising a winding part and a lead part extended from the winding part;
a coil holder which holds the coil; and
a board which is supported by the coil holder;
a movable body comprising a magnet facing the winding part;
a connection body which relatively movably connects the movable body with the support body; and
a magnetic drive mechanism which comprises the coil and the magnet and is structured to relatively move the support body and the movable body;
wherein the coil holder comprises a coil holding part which holds the winding part and a board support part which supports the board on an outer side in a radial direction of the coil holding part;
wherein a board surface of the board comprises a land with which the lead part is connected;
wherein the board support part comprises a recessed part at a position overlapping with the board when viewed in a direction along the board surface; and
wherein the lead part is extended from the winding part to the land via the recessed part and comprises a resiliently bent portion which is resiliently bent in an inside of the recessed part,
wherein in a case that a direction where the winding part and the magnet face each other is defined as a first direction, and two directions perpendicular to the first direction and perpendicular to each other are defined as a second direction and a third direction,
the coil holding part and the board support part are arranged in the second direction,
the board surface faces an opposite side to the coil holding part in the second direction,
the board comprises:
a wiring connection part comprising the land; and
a pair of leg parts which are protruded to one side in the first direction from both end portions in the third direction of the wiring connection part, the board support part comprises:
  a pair of slits into which both end edges in the third direction of the board are respectively inserted from an other side in the first direction; and
  an insertion part which is inserted from the one side in the first direction to a cut-out opening of the board sectioned by the pair of the leg parts and the wiring connection part,
the insertion part comprises a tip end face which is abutted with the wiring connection part, and
the recessed part is provided on the tip end face,
wherein
  the coil holder is made of resin,
  the pair of the leg parts comprise a pair of protruded parts which are contacted with the insertion part from both sides in the third direction,
  in a state before the insertion part is inserted to the cut-out opening, the pair of the protruded parts face each other in the third direction, and
  a distance in the third direction between the protruded parts is narrower than a width in the third direction of the insertion part,
wherein
  the insertion part comprises:
    a pair of inclined faces which are inclined in a direction separated from the wiring connection part toward a direction separated from the tip end face on both sides in the third direction of the tip end face; and
    a pair of side faces which are extended to an opposite side with respect to the wiring connection part in the first direction from ends of the inclined faces on an opposite side to the tip end face, and
  in a state before the insertion part is inserted to the cut-out opening, a distance of the protruded parts facing each other in the third direction is wider than a width in the third direction of the tip end face and is narrower than a distance in the third direction between the pair of the side faces.

8. A manufacturing method of the actuator defined in claim 7, the manufacturing method comprising:
  holding the winding part in the coil holding part of the coil holder and extending the lead part to an opposite side to the coil holding part in the second direction with respect to the recessed part;
  disposing the board on the other side in the first direction with respect to the pair of the slits in a posture that the board surface faces the opposite side to the coil holding part in the second direction;
  inserting both end edges in the third direction of the board into the pair of the slits from the other side in the first direction, and inserting the insertion part into the cut-out opening of the board;
  supporting the board at a temporary support position where each of the pair of the protruded parts is contacted with each of the inclined faces of the insertion part and a space is formed between the wiring connection part and the tip end face;
  connecting a tip end portion of the lead part with the land of the board located at the temporary support position; and
  pushing the board located at the temporary support position to a support position where each of the pair of the protruded parts is contacted with each of the side faces of the insertion part and the tip end face is abutted with the wiring connection part.

9. The actuator according to claim 7, further comprising an adhesive layer which fixes the coil to the coil holder,
  wherein the adhesive layer is provided between the winding part and the coil holding part without being provided between the resiliently bent portion and an inner wall face of the recessed part.

10. The actuator according to claim 7, wherein
  the coil holding part is a hole which accommodates the winding part,
  the coil holder comprises a guide groove which guides the lead part, and
  the guide groove communicates with the recessed part and the coil holding part.

11. The actuator according to claim 7, wherein the guide groove comprises:
  a first groove portion which is connected with the recessed part in a depth shallower than the recessed part; and
  a second groove portion which is extended from the first groove portion toward the coil holding part and is deepened as approaching the coil holding part.

* * * * *